US007414710B2

(12) United States Patent
Wunderer et al.

(10) Patent No.: US 7,414,710 B2
(45) Date of Patent: Aug. 19, 2008

(54) DEVICE FOR CHECKING BANKNOTES

(75) Inventors: Bernd Wunderer, München (DE); Norbert Holl, Germering (DE)

(73) Assignee: Giesecke & Devrient GmbH, Munich (DE)

( * ) Notice: Subject to any disclaimer, the term of this patent is extended or adjusted under 35 U.S.C. 154(b) by 0 days.

(21) Appl. No.: 10/557,819

(22) PCT Filed: May 21, 2004

(86) PCT No.: PCT/EP2004/005514

§ 371 (c)(1), (2), (4) Date: Feb. 5, 2007

(87) PCT Pub. No.: WO2004/104948

PCT Pub. Date: Dec. 2, 2004

(65) Prior Publication Data

US 2007/0182951 A1 Aug. 9, 2007

(30) Foreign Application Priority Data

May 23, 2003 (DE) ................................ 103 23 409

(51) Int. Cl.
*G06K 9/74* (2006.01)

(52) U.S. Cl. ........................................................ 356/71

(58) Field of Classification Search ....................... None
See application file for complete search history.

(56) References Cited

U.S. PATENT DOCUMENTS

| | | | |
|---|---|---|---|
| 5,034,616 | A | 7/1991 | Bercovitz |
| 5,436,716 | A | 7/1995 | Stein |
| 6,744,050 | B1 | 6/2004 | Hornung et al. |
| 6,768,123 | B2 | 7/2004 | Giering |
| 6,891,180 | B2 | 5/2005 | Holl et al. |
| 6,937,322 | B2 | 8/2005 | Gerz et al. |

FOREIGN PATENT DOCUMENTS

| | | |
|---|---|---|
| DE | 198 40 482 | 3/2000 |
| DE | 198 40 482 A1 | 3/2000 |
| DE | 100 00 030 | 7/2001 |
| DE | 100 07 887 | 8/2001 |
| DE | 101 27 836 | 1/2003 |
| EP | 0 395 833 | 11/1990 |
| EP | 1 081 660 | 3/2001 |
| EP | 1 081 660 A2 | 3/2001 |
| EP | 1 265 199 | 12/2002 |
| GB | 2 093 179 | 8/1982 |
| GB | 2 093 179 A | 8/1982 |

*Primary Examiner*—Michael P Stafira
(74) *Attorney, Agent, or Firm*—Bacon & Thomas, PLLC

(57) ABSTRACT

The invention relates to an apparatus for checking bank notes, having a linear sensor and a linear light source wherein the bank notes are moved past between the sensor and the light source for the check, and the sensor detects light from the light source transmitted by the bank notes.

The invention starts out from the consideration of equipping the linear sensor and the linear light source each with an aperture such that the aperture of the light source is equal to or smaller than the aperture of the sensor.

10 Claims, 1 Drawing Sheet

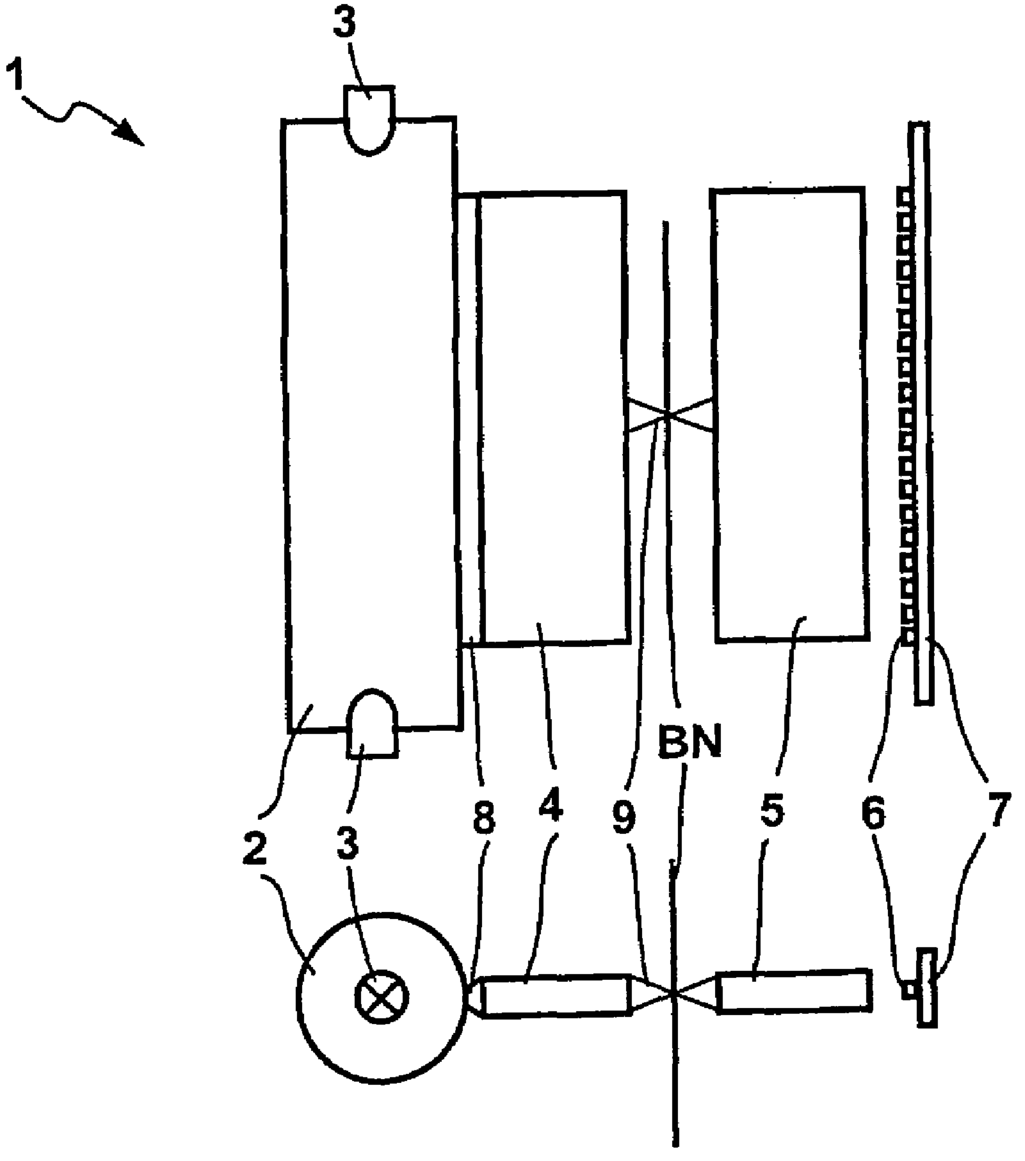
Fig.

DEVICE FOR CHECKING BANKNOTES

FIELD OF THE INVENTION

This invention relates to an apparatus for checking bank notes, having a linear sensor and a linear light source wherein the bank notes are moved past between the sensor and the light source for the check, the sensor detecting light from the light source transmitted by the bank notes.

BACKGROUND

Such apparatuses are known for example from DE 198 40 482 A1 and normally referred to as transmission sensors since light from a light source transmitted by the bank notes to be checked is detected by a sensor and evaluated. A distinction can be made here between light-field and dark-field measurement, depending on whether the illumination is so disposed that the light from the source hits the detector (light-field) or not (dark-field). With dark-field illumination the detector detects only light scattered by the bank note, i.e. changed in its direction.

Known light-field apparatuses are frequently used for recognizing the format of bank notes and/or defects, e.g. tears or holes, by the shadow cast in the bank notes. For this purpose the light background is imperative, on the one hand, to permit e.g. the defects of areas with dark printing to be reliably distinguished. On the other hand, the shadow itself should be as dark as possible. In particular for recognizing small defects (such as pinholes or only slightly open tears) or laser-produced perforations with diameters in the order of magnitude of 0.05 mm, the contrast of the bank notes with the background must be as high as possible. This must also apply to areas with maximum transmission, e.g. areas without printing, or even to transparent areas such as see-through registers on bank notes with a plastic substrate.

Further, in conventional bank note processing systems the transport plane of the bank notes is only imprecisely defined; the bank notes can flutter around a target plane, thereby causing changes in the image distances from illumination and imaging optics. To prevent this flutter from leading to fluctuations in intensity and scale, both optics must be of sufficiently telecentric design, i.e. they may only use light beams that deviate only a few degrees from the parallels to the optical axis.

In known apparatuses for checking bank notes in the light field, the background used is as a rule a line of chip LEDs or backlit surface. This causes the contrast to be adjusted to a lower value than can be obtained with optimal illumination, because the bank note is also illuminated by light beams that, because of their direction relative to the optical axis, can contribute to scattered light but not to the background.

SUMMARY

It is therefore the problem of the present invention to specify an apparatus for checking bank notes having a linear sensor and a linear light source wherein the bank notes are moved past between the sensor and the light source for the check, the sensor detecting light from the light source transmitted by the bank notes, which merely requires a light source of minimal luminous intensity but maximizes the contrast between the light background and the light transmitted by scattering. Additionally, it should allow only small scale fluctuations upon flutter of the bank notes.

The invention starts out from an apparatus for checking bank notes having a linear sensor and a linear light source wherein the bank notes are moved past between the sensor and the light source for the check, the sensor detecting light from the light source transmitted by the bank notes, wherein the linear sensor and the linear light source each have an aperture such that the aperture of the light source is equal to or smaller than the aperture of the sensor, both apertures being sufficiently small.

The inventive apparatus has the advantage that the adaptation of the apertures of light source and sensor cause all light beams from the source that illuminate the area of the bank note detected by the detector to reach the detector if a bank note is absent. Therefore, the luminous intensity of the light source can be selected so small that the illuminance in the plane of the bank note need not be greater than is required for the full output of the sensor if a bank note is absent between light source and sensor. Thus, only a low luminous intensity of the light source is required, which permits the occurring power dissipation to be greatly reduced.

Additionally, the adapted aperture of the illumination permits a minimization of the light scattered by the bank notes to be checked, so that high contrast is obtained. This contrast (defined here as the quotient of the signal without a bank note to the signal with a bank note) is approximately equal to the quotient from 16 times the focal ratio K (whose reciprocal is called the aperture ratio) determining the aperture and the transmission coefficient T (always smaller than 1) of the bank note at 1:1 imaging and ideal scattering in the bank note according to Lambert's law (into a spherical characteristic in the half-space). Thus, if illumination and imaging each have an aperture corresponding to the focal ratio $K=2$, the maximally obtainable contrast is approximately 64 times the reciprocal transmission coefficient $1/T$ with Lambert scattering; at a focal ratio 4 it is already 256 times.

In one embodiment, the apparatus has homogeneous SELFOC® lenses with homogeneous imaging properties in front of light source and sensor in each case. These consist of a parallel arrangement of small-diameter lightguide rod lenses with upright 1:1 imaging. For imaging a linear object, the arrangement is substantially linear in the line direction with one or more rows perpendicular thereto. The images produced by the individual rod lenses overlap to form a linear image. The aperture of the individual rod lens determines the aperture in the total image. The smaller the aperture is (typical focal ratios being between 2 and 5 in the described application), the greater the contrast is and the more the illumination and imaging beam paths also approach the ideal of the telecentric beam path, i.e. the smaller the scale changes through bank-note flutter also are.

The use of inexpensive SELFOC® lenses makes an approximatively telecentric beam path possible at all in a compact design and realizable at considerably lower costs. Conventional telecentric objectives are very large in their design. In particular, their diameter must be equal to the greatest dimension to be detected, that would be approx. 100 mm for the gap to be detected. Their focal length must then also be in the same order of magnitude; the overall length is usually three to four times that.

The embodiment further has the advantage that the apparatus can be easily integrated into a transport system of a bank note processing machine due to the small extension of the SELFOC® lenses in the direction of transport of the bank notes to be checked. In particular, the small extension also allows design as a free flight path, i.e. the transport system extends only as far as the front and rear limits of the apparatus while the transport system does not extend into the area of the apparatus, thereby permitting the bank notes to be checked completely without being covered by the transport system.

In a further embodiment, the apparatus has a light source containing an Ulbricht cylinder. This is the cylindrical execution of the well-known Ulbricht sphere.

The further embodiment has the advantage that the Ulbricht cylinder, in particular together the SELFOC lens, permits homogeneous, linear illumination with a given aperture.

Further advantages of the present invention will be explained and described in more detail hereinafter with reference to the enclosed figure.

BRIEF DESCRIPTION OF THE DRAWINGS

The single figure shows the schematic structure of an apparatus 1 for checking bank notes BN in a view in the transport direction of the bank notes to be checked and a view from the side.

DETAILED DESCRIPTION OF VARIOUS EMBODIMENTS

The apparatus 1 for checking bank notes BN has a linear light source 2, 3, 4 and a linear sensor 5, 6, 7. The linear sensor 5, 6, 7 can be formed by a linear carrier 7 with photodiodes 6 or also by a linear CCD or CMOS array. With commercially available components it is thus readily possible to obtain resolutions of 0.1 mm. Linear light source 2, 3, 4 and linear sensor 5, 4, 6 have extensions corresponding at least to the dimension of the largest bank note to be examined. However, the extensions are advantageously selected greater than the dimension of the largest bank note to be examined in order to detect the edges of the bank note when its position fluctuates relative to the sensor. In dependence on the transport of the bank notes to be checked, "dimension of the bank note" is intended to mean either its length or its width.

Linear light source 2, 3, 4 and linear sensor 5, 6, 7 each have an aperture (9 designating pencils of rays in the two cutting planes shown) which is so formed that the aperture of the light source 2, 3, 4 is equal to or smaller than the aperture of the sensor 5, 6, 7. The apertures of light source 2, 3, 4 and sensor 5, 6, 7 can be formed by an imaging system 4 of the light source 2, 3, 4 and an imaging system 5 of the sensor 5, 6, 7 in each case. In particular, the imaging systems 4 and 5 can be of homogeneous structure, with homogeneous imaging properties. The imaging systems 4 and 5 can be formed by lenses. Particularly suitable lenses 4 and 5 are lens arrays, i.e. linearly disposed gradient index lenses which produce 1:1 imaging and detect only beams of a small angular range. Such linearly disposed gradient index lenses are known under the name SELFOC®. Linearly disposed gradient index lenses have moreover the advantage of having only a small extension, e.g. 2 mm, in the direction of transport of the bank notes to be checked. This allows the apparatus 1 to be installed in the transport system of a bank note processing machine with a so-called free flight path, i.e. no parts of the transport system are located in the area of the apparatus 1, so that the surfaces of the bank notes to be checked can be detected completely by the apparatus 1 or the sensor 5, 6, 7.

Further, diaphragms (not shown) can be used in combination with the imaging systems 4 and/or 5, for further adjustment of the particular desired aperture.

The linear light source 2, 3, 4 emits mainly homogeneous light. The light source 2, 3, 4 is advantageously formed for this purpose by an Ulbricht cylinder 2 with illuminants 3, e.g. LEDs or laser diodes. The Ulbricht cylinder 2 produces via the imaging system 4 a homogeneously illuminated surface in the plane of the bank notes to be checked, the illuminating surface being formed by the back wall of the Ulbricht cylinder 2. Homogenization of the light is obtained by multiple diffuse reflection on the walls of the Ulbricht cylinder 2 and the blurred imaging of the back wall by the imaging system 4 which has its focus approximately in the center of the Ulbricht cylinder 2. At a length of 100 mm, a cylinder radius of 10 mm and an output gap width of 1 mm, an efficiency of approx. 15% for the output light can be obtained. By connecting directly to the cylinder wall a channel 8 broadening from for example 1 to 2 mm toward the imaging system 4, with reflecting walls inclined about 30°, the efficiency of output can be approximately doubled and thus the power of the illuminants 3 accordingly reduced.

As further means for improving the output degree, prism films and/or reflective polarizers (VIKUITT™ from 3M) can be provided in the output gap of the Ulbricht cylinder 2. These were developed for light concentration into the utilizable angle of vision and low-loss polarization in LCD displays. The detection of polarized light with a parallel polarizer on the side of the sensor 5, 6, 7 furthermore produces a further increase in contrast by a factor of two, since the scattering eliminates the polarization and thus halves the signal.

If the illuminants 3 are mounted at the ends of the Ulbricht cylinder 2, as shown, a drop toward the center results due to continuous output losses in the longitudinal direction. The inhomogeneity becomes greater the smaller the diffuse reflection coefficient of the wall of the Ulbricht cylinder 2 is. At a given reflection coefficient a more homogeneous output is obtained by designing the wall to be reflective partially in areas that cannot be detected directly by the imaging system 4.

Another possibility for homogenization is to have a plurality of illuminants 3 protruding laterally into the Ulbricht cylinder 2. In this case it is advantageous to mount the illuminants somewhat remote from the ends (e.g. at approx. ¼ and ¾ of the length).

The apparatus 1 for checking bank notes BN is used particularly advantageously for determining the format of the bank notes BN to be checked and/or defects, such as tears or holes, for which purpose it is sufficient to process a binary signal produced by the sensor 5, 6, 7 from the signal with the help of a suitable threshold, which can detect even small holes and tears particularly with high precision due to the described great contrast. In particular, it is also possible to detect the small defects mentioned at the outset, so-called microholes and microtears, which arise e.g. from pinpricks or laser perforation, etc.

The apparatus 1 for checking bank notes BN is likewise used advantageously for checking areas with maximum transmission, e.g. areas without printing or transparent areas such as see-through registers on bank notes with a plastic substrate. Within these areas it is even possible to recognize defects such as tears and/or holes, including the above-mentioned small defects, microholes or microtears.

The recognition of defects can be improved if means for opening the defects, such as tears and/or holes, are employed during the check by the apparatus 1. This can be done for example by compressed air aimed at the surface of the bank note BN. Likewise, the bank note BN can be beaten or bent by mechanical means, so that the defects can be clearly recognized. Recognition is considerably improved particularly in the case of the stated microholes or microtears if the described active measures for opening the defects are carried out.

A further improvement in the processing of the signals from the sensor 5, 6, 7 can be obtained if the signals produced by the sensor 5, 6, 7 are produced and/or processed in such a way that they have several gradations, i.e. the signals are produced and/or processed as gray scale signals.

The invention claimed is:

1. In apparatus for checking bank notes, including a linear sensor and a linear light source wherein the bank notes are moved past between the sensor and the light source for the check, the sensor detecting light from the light source transmitted by the bank notes, the improvement comprising:

the linear sensor and the linear light source each have an aperture such that the aperture of the light source is equal to or smaller than the aperture of the sensor;

wherein the light source is formed by an Ulbricht cylinder; having a channel broadening in the direction of a light exit and having inclined, mirror-plated walls.

2. The improvement according to claim 1, wherein the apertures of the sensor and the light source are each formed by an imaging system.

3. The improvement according to claim 2, wherein the imaging systems are of homogeneous structure, with homogeneous imaging properties.

4. The improvement according to claim 2, wherein the imaging systems are formed by lenses.

5. The improvement according to claim 4, wherein the lenses are formed by linearly disposed gradient index lenses.

6. The improvement according to claim 1, wherein the linear light source emits homogeneous light along at least part of its extension.

7. The improvement according to claim 1, a polarizer is provided on the side of the light source and a polarizer on the side of the sensor, the polarizers being oriented parallel.

8. The improvement according to claim 1, including means for opening defects present in the bank notes.

9. Method for using the apparatus as claimed in claim 1, comprising using the apparatus for recognizing defects in bank notes.

10. Method according to clam 11, wherein the defects are at least one of microtears and microholes.

* * * * *